US008212439B2

(12) United States Patent
Dautel et al.

(10) Patent No.: US 8,212,439 B2

(45) Date of Patent: Jul. 3, 2012

(54) FAN-MOTOR UNIT

(75) Inventors: Pascal Dautel, Le Mans (FR); Stéphane Foulonneau, Pontvallain (FR)

(73) Assignee: Brose Fahrzeugteile GmbH & Co. KG, Wurzburg, Wurzburg (DE)

( * ) Notice: Subject to any disclaimer, the term of this patent is extended or adjusted under 35 U.S.C. 154(b) by 198 days.

(21) Appl. No.: 12/676,196

(22) PCT Filed: Sep. 2, 2008

(86) PCT No.: PCT/EP2008/061540
§ 371 (c)(1),
(2), (4) Date: Jun. 28, 2010

(87) PCT Pub. No.: WO2009/030678

PCT Pub. Date: Mar. 12, 2009

(65) Prior Publication Data

US 2010/0264762 A1 Oct. 21, 2010

(30) Foreign Application Priority Data

Sep. 3, 2007 (FR) ...................................... 07 06148

(51) Int. Cl.
*H02K 9/00* (2006.01)
*H02K 23/66* (2006.01)

(52) U.S. Cl. ................ 310/62; 310/63; 310/64; 310/58; 310/68 B

(58) Field of Classification Search .................... 310/64, 310/62, 63, 52, 58, 59; 361/679.48
See application file for complete search history.

(56) References Cited

U.S. PATENT DOCUMENTS 5,946,192 A 8/1999 Ishigami et al. .............. 361/704
5,969,445 A * 10/1999 Horiuchi et al. ................ 310/64
6,384,494 B1 * 5/2002 Avidano et al. ................. 310/58
7,196,439 B2 * 3/2007 Pierret et al. .................... 310/58

FOREIGN PATENT DOCUMENTS

| | | |
|---|---|---|
| DE | 202005004274 | 7/2006 |
| FR | 2764747 | 12/1998 |
| FR | 2827345 | 1/2003 |
| FR | 2871534 | 12/2005 |

OTHER PUBLICATIONS

Notification of Transmittal of the International Search Report and the Written Opinion of the International Searching Authority, or the Declaration for International application No. PCT/EP2008/061540 filed Sep. 2, 2008; 12 pages.

* cited by examiner

*Primary Examiner* — Quyen Leung
*Assistant Examiner* — Thomas Truong
(74) *Attorney, Agent, or Firm* — Westman, Champlin & Kelly, P.A.

(57) ABSTRACT

A fan-motor unit comprises a fan driven by an electric motor, both mounted on a support, at least one inlet (I) and one outlet (S) for a forced air flow, an electronic circuit board for controlling the motor, and a radiator at least partially immersed in the forced air flow. The radiator has a curved peripheral edge determining a convex face and a concave face of the said radiator, the electronic circuit board being in contact with the said radiator on the concave face side and a substantially cylindrical bearing surface on the convex face side of the said radiator. A radial gasket that forms a skirt comprises a first end secured to the support, a free second end, and a substantially cylindrical interior face between the first and second ends, and the interior face of the radial gasket bears against the bearing surface so as to isolate the electronic circuit board from the air flow.

6 Claims, 3 Drawing Sheets

1 12 11 11 16 S 18 141 19 171 142 134 131 172 173 143 14 111 15 17 13

FAN-MOTOR UNIT

CROSS-REFERENCE TO RELATED APPLICATION

Figure 1:
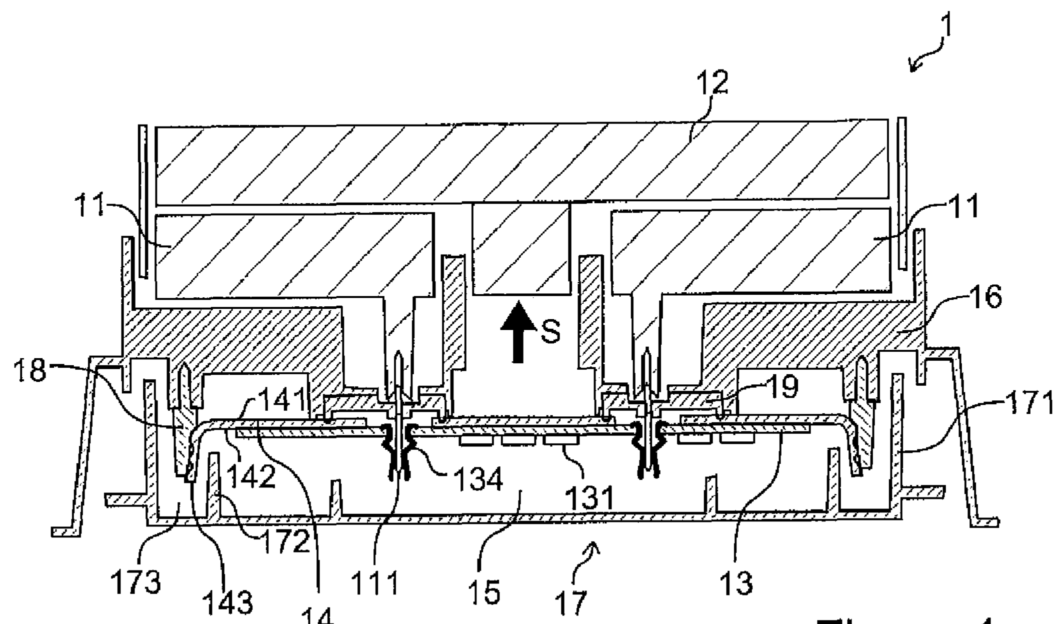

This Application is a Section 371 National Stage Application of International Application No. PCT/EP2008/061540, filed Sep. 2, 2008, published as WO 2009/030678, not in English, the content of which is hereby incorporated by reference in its entirety.

The present invention relates to a fan-motor unit in which the control electronic circuit board is cooled by forced air.

More specifically, the present invention relates to a fan-motor unit such as a unit used for ventilating land motor vehicles, in which the control electronic circuit board is cooled by forced air blown by the said unit without the risk of the circuit board being damaged by contaminants present in the forced air flow.

Present-day land motor vehicles are equipped, in order to control the flow of air for the passenger compartment, with motor-fan units usually built into an air conditioning system. These fan-motor units comprise in particular an electric motor driving a fan, and a motor control device carried by a control electronic circuit board. When the motor is running, the electronics of the circuit board are in operation and give off heat.

In order to dissipate the heat, it is known practice to adapt the air flow blown by the fan so that it passes through the fan-motor unit, thus cooling the motor and the electronic circuit board which is generally provided with a radiator to facilitate heat exchange. In a device such as this, the forced air comes into contact not only with the radiator but also with the electronic circuit board and the various electronic components thereon. The cooling thus obtained is generally satisfactory, but when the forced air is contaminated, for example in a damp environment and/or contaminated with mud or dust particles, there is the risk that electrical connections between components or even components of the circuit board themselves will be damaged.

In order to limit the damage caused by these contaminants the French patent application published under the number 2871534 discloses protecting the sensitive electronic components of the electronic circuit board by ducting the forced air into a motor space determined by a motor housing and one face of the circuit board on which a radiator is positioned.

In this case, the sensitive electronic components of the circuit board are positioned on one face of the said circuit board which is the opposite face to the radiator, and sealing between the face of the circuit board on the radiator side and the motor housing is afforded by a flat gasket.

However, the forced air flow is sometimes no longer restricted to the motor space because of defective sealing of the flat gasket caused in particular by the fact that:

- the production of the elements involved in sealing have a permissible tolerance;
- when the circuit board is removed, the flat gasket may become damaged or may be re-fitted incorrectly;
- the ageing of the gasket weakens it.

When contaminants enter the space in which the components are situated as a result of defective sealing, these contaminants prove to be all the more harmful since they cannot readily be removed from this space.

Another disadvantage of the proposed solution is that it is ill-suited to situations in which electronic components are mounted on both faces of the electronic circuit board.

It is an object of the present invention to improve the protection of the electronic circuit board by proposing a fan-motor unit in which the control electronic circuit board is protected from the forced air by means, in particular, of a suitable radiator and of a suitable form of gasket.

The fan-motor unit according to the invention comprises a fan driven by an electric motor, both mounted on a support, at least one inlet and one outlet for a forced air flow.

The unit also comprises a motor control electronic circuit board, and a radiator, at least partially immersed in the forced air flow, mounted on the circuit board in order to cool it.

In order to protect the electronic circuit board, the radiator has a curved peripheral edge which determines:

- a convex face and a concave face of the radiator, the circuit board being in contact with the radiator on the concave face side,
- a substantially cylindrical bearing surface on the convex face side of the radiator.

A radial gasket that forms a skirt has a first end secured to the support, a free second end at the opposite end to the first end, and a substantially cylindrical interior face between the first and second ends. The radial gasket is such that the interior face of the radial gasket at least partially bears against the bearing surface in order to provide sealing at the bearing surface.

In order to cool the circuit board without the risk of contaminating it with the forced air, the motor, the fan and the support are preferably positioned on the convex face side of the radiator so that the forced air flow flows over the convex face and so that the radial gasket bearing against the bearing surface isolates the concave face and the electronic circuit board from the said flow.

Advantageously, the radiator has at least one boss determining a cavity between the concave face of the said radiator and the electronic circuit board located on the radiator, so that the electronic components situated between the radiator and the circuit board find themselves housed in the said cavity.

In order to improve the sealing of the protective device, the interior face of the radial gasket preferably has at least one perimetral boss which comes into contact with the bearing surface. According to an alternative form, the bearing surface may have a groove that collaborates with the said boss by means of the one being fitted into the other.

In order to provide sealing of the electrical connections between the motor and the circuit board, which connections are made by means of connectors passing through openings in the radiator, each opening is covered by an axial gasket which has a passage for each connector passing through it. The said axial gasket exerts on the said passage a radial pressure for sealing against lateral surfaces of the through-connector.

To allow contaminants, particularly liquids, to be drained away and removed, the fan-motor unit advantageously comprises a cap covering the electronic circuit board and the radial gasket. The cap determines, with the radiator, a circuit board region and has a closed end on which a peripheral rim and an internal web form a peripheral channel into which the radial gasket and the peripheral edge of the radiator partially fit. Holes creating communications between the said peripheral channel and the outside of the circuit board region allow contaminants to be removed.

Figure 2:
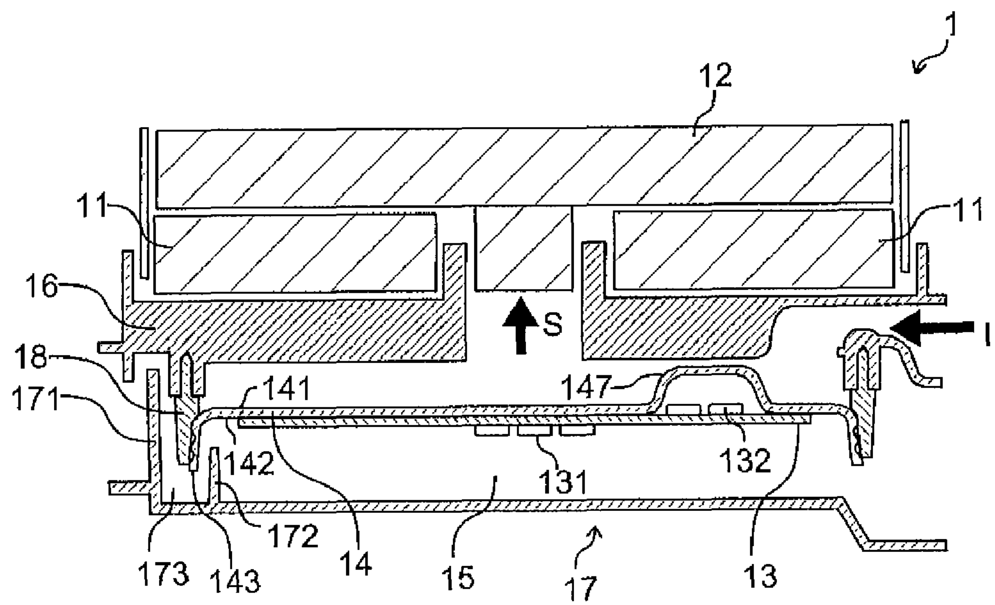
Figure 3:
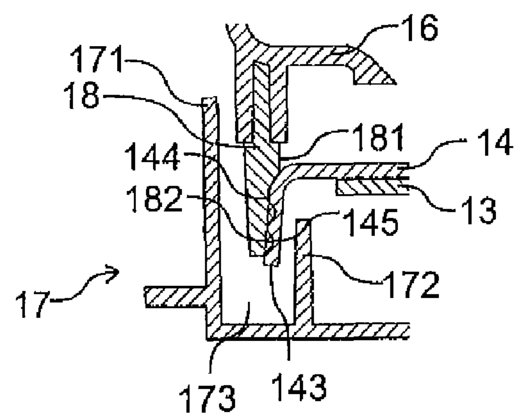
Figure 4:
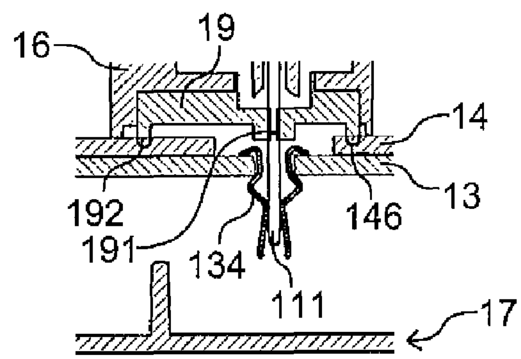
Figure 5:
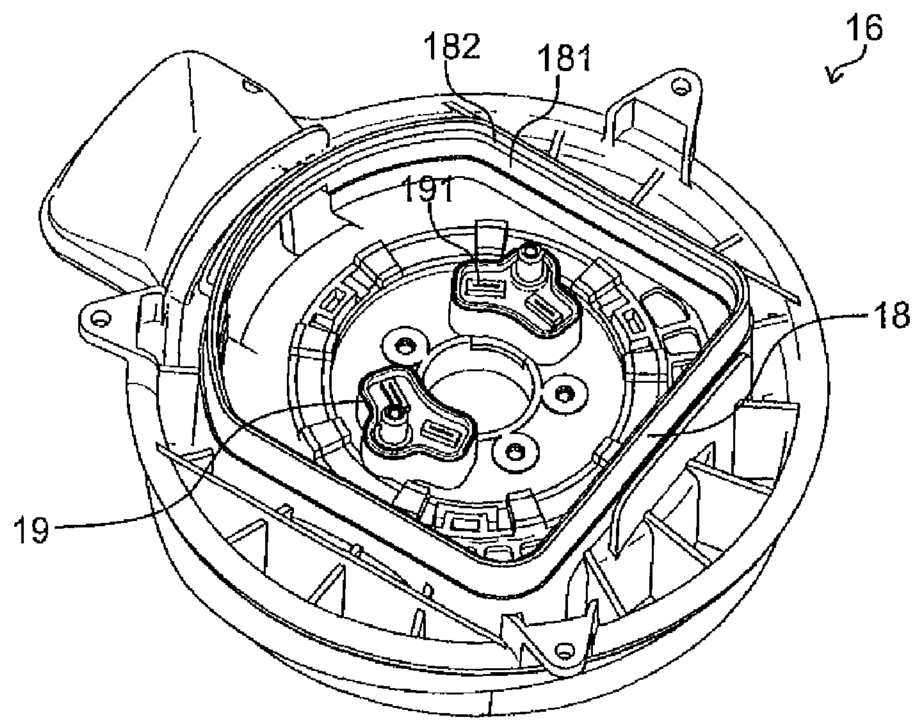
Figure 6A:
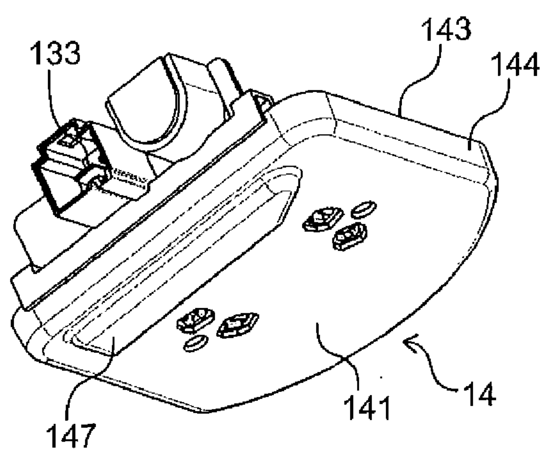
Figure 6B:
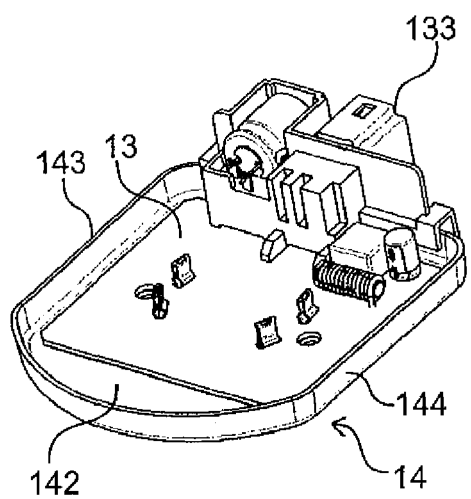
Figure 7A:
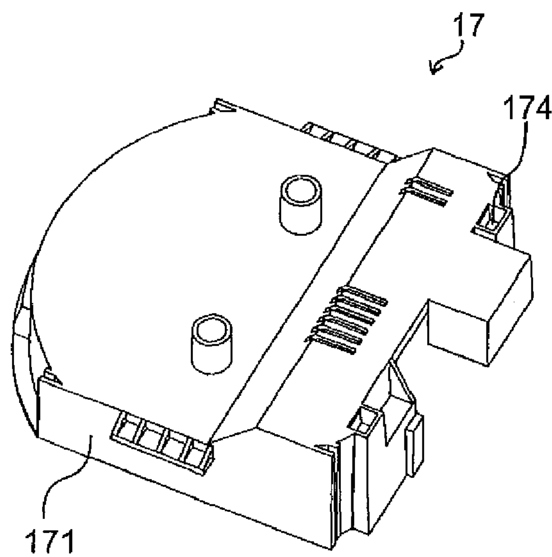
Figure 7B:
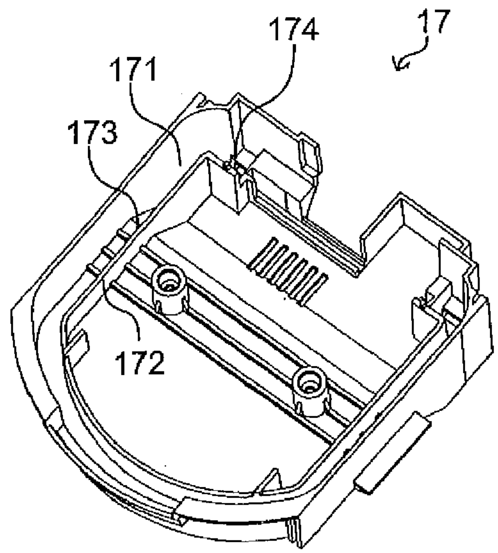

The following description of one exemplary embodiment of the invention is given with reference to the attached figures which depict:

FIG. 1: a schematic view of a cross section of a fan-motor unit according to the present invention, FIG. 2: a schematic view of a section through the fan-motor unit of FIG. 1 from a different angle, FIG. 3: a partial schematic view of a section through the fan-motor unit in a region of sealing using a radial gasket, FIG. 4: a partial schematic view of a section through the fan-motor unit in a region in which flat contacts belonging to the motor pass through the radiator, FIG. 5: a perspective view of the fan-motor unit support, FIG. 6*a* and FIG. 6*b*: perspective views of the radiator, secured to the control electronic circuit board, from two different angles, FIG. 7*a* and FIG. 7*b*: perspective views of the cap that protects the electronic circuit board compartment, from two different angles.

As illustrated by FIGS. 1 and 2, a fan-motor unit 1 comprises, in the conventional way:

an electric motor 11, a fan 12 driven by the motor 11, and a motor control electronic circuit board 13 provided with a radiator 14.

The fan-motor unit 1 also comprises structural elements to which the other elements are attached and/or which afford it protection. These structural elements in particular determine:

a first space known as the "circuit board region" 15 in which the electronic circuit board 13 is located, a second space in which the motor 11 and the fan 12 are located, a fan-motor unit support 16 for attaching the said unit to the interior, for example, of a motor vehicle or a vehicle air conditioning system.

The fan 12 and the electric motor 11 are schematically depicted in FIGS. 1 and 2. The motor in particular and in the conventional way comprises a stator and a rotor, and is, for example, a brushless motor. The fan, for example a centrifugal impellor, is mounted on a rotating shaft of the motor.

The electronic circuit board 13 essentially consists of a printed circuit, of electronic components 131 and 132 which are fixed respectively to a lower face and to an upper face of the said circuit board. The electronic circuit board comprises connecting means 133 for receiving a supply voltage and control signals, and delivers a supply voltage to the motor 11 by means of electric connectors 111.

The circuit board region 15 is essentially determined by:

the radiator 14, and an external cap 17.

The radiator 14 comprises a curved peripheral edge 143 determining a convex first face 141 on the motor side and a concave second face 142 on the circuit board region side. The curved peripheral edge 143 also determines a substantially cylindrical bearing surface 144 on the convex face 141 side of the radiator.

The radiator 14 is preferably made of a material that is a good conductor of heat, for example of an aluminium alloy, and the upper face of the electronic circuit board 13 is in contact with the concave face 142 of the said radiator.

A radial gasket 18, visible in perspective in FIG. 5, forms a skirt and has a first end secured to the support 16, for example force-fitted, bonded and/or overmoulded into a groove belonging to the said support, and a free second end at the opposite end to the first end.

The radial gasket also has a substantially cylindrical interior face 181 between the first and second ends, the said interior face bearing against the bearing surface 144 of the radiator 14 as illustrated in FIG. 3.

The shape and dimensions of the radial gasket 18 are such that the radiator 14 fits into an internal perimeter determined by the said radial gasket and such that the curved peripheral edge 143 exerts radial pressure on the gasket over the entire interior perimeter.

The radial gasket 18 preferably has one or more perimetral boss/es 182 on its interior face 181 and which come into contact with the bearing surface 144.

The use of a radial gasket has the advantage that very little axial force is required for insertion/extraction and the tolerance on the relative positioning of the elements can be very much better than if the items are assembled using an axial gasket, and that a limited, but actual, axial movement can be had without any loss of sealing. The sealing obtained therefore proves itself to be somewhat insensitive to the tolerances found in this type of device.

The bearing surface 144 may also have one or more groove/s 145 collaborating with the bosses 182 of the gasket in order to introduce an effect of the radiator 14 being snap-fastened into the said radial gasket thus improving the sealing of the said gasket in this region, particularly in an environment subject to vibration.

As illustrated in FIG. 2, the fan-motor unit comprises an inlet I and an outlet S for an air flow which is forced into the unit by the rotation of the fan 12. The forced air flow flows through a space contained between the convex face 141 of the radiator 14 and the support 16 before being directed towards the fan via the outlet S.

Owing to the presence of the radial gasket 18 fixed to the support 16 and bearing against the bearing surface 144 of the radiator 14, the forced air flow flows over the convex face 141, thus cooling the said radiator and the electronic circuit board 13 fixed to the concave face 142 without the circuit board being placed in contact with the air flowing between I and S and liable to contain contaminants (moisture, dust, etc.) because it has its origin outside the vehicle.

As illustrated in FIG. 1, the circuit board region 15 is enclosed by the exterior cap 17 which comprises:

a peripheral rim 171, a closed end facing the circuit board.

The exterior cap 17 covers the region of the radial gasket 18 thus affording the said gasket some mechanical protection.

On one face of the closed end of the cap 17 situated on the circuit board region 15 side, the said cap has an internal web 172 substantially parallel to the peripheral rim 171 visible in particular in FIG. 1, 3 or 7*b*, of a height shorter than the said peripheral rim. The web 172 and the peripheral rim 171 determine on the closed end of the cap a peripheral channel 173 inside the circuit board region and into which the radial gasket 18 and the peripheral edge 143 partly fit.

Holes 174, visible in FIGS. 7*a* and 7*b*, create communications between the peripheral channel 173 and the outside of the cap 17 so that in the event of an ingress of liquid in the region of the radial gasket 18, the said liquids can be drained away by the said peripheral channel and removed through the said holes to outside the circuit board region 15.

As illustrated in FIGS. 1 and 4, connectors 111 for electrically supplying the motor 11 are connected to the electronic circuit board 13 through openings made in the radiator.

The said connectors are, for example, flat contacts secured to the motor 11 and are connected to the electronic circuit board 13 using connectors 134 of the clamp type.

An axial gasket 19, on the convex face 141 of the radiator 14, seals each opening in the said radiator.

An axial gasket 19 has a passage 191 through which a connector 111 passes, for example a slot or a very fine gauze that is torn at the time of insertion, and which applies radial pressure to the sides of the said connector.

Because of this axial gasket 19, the air flowing over the convex face 141 of the radiator 14 is unable to enter the circuit board region 15 through the openings in the radiator. The passage 191 has the advantage of requiring only a small axial force to insert/extract the connector into/from the said passage, thus limiting the risk of damaging the said axial gasket.

This axial gasket 19 advantageously has a perimetral boss 192 which bears against the convex face 141 of the radiator 14. This face may also have a groove 146 corresponding to the boss and into which this boss can be fitted.

In one particular embodiment, the radiator 14 comprises one or more boss/es 147 forming one or more cavity/cavities between the concave face 142 of the radiator and the upper face of the electronic circuit board 13. The cavities prevent any interference between the radiator 14 and the electronic components 132 mounted on the upper face of the electronic circuit board or electrical connections passing through the said circuit board such as with the connecting means 133 for example.

In a particularly economical embodiment, the radiator 14 is produced by a press-forming method.

The invention thus makes it possible to produce a fan-motor unit 1 with improved protection of the control electronic circuit board that proves somewhat invulnerable to the removal/re-fitting of the elements of the said unit.

The invention claimed is:

1. Fan-motor unit comprising: a fan driven by an electric motor, both mounted on a support, at least one inlet (I) and one outlet (S) for a forced air flow, an electronic circuit board for controlling the motor, a radiator for cooling the electronic circuit board, which is mounted in contact with the said electronic circuit board and at least partially immersed in the forced air flow, the said fan-motor unit being characterized in that: the radiator has a curved peripheral edge:

- determining a convex face and a concave face of the said radiator, the electronic circuit board being in contact with the said radiator on the concave face side,
- determining a substantially cylindrical bearing surface on the convex face side of the said radiator, a radial gasket forming a skirt comprises: a first end, the said first end being secured to the support, a second end at the opposite end to the first end, the said second end being free, a substantially cylindrical interior face between the first and second ends, and in that the interior face of the radial gasket at least partially bears against the bearing surface.

2. Fan-motor unit according to claim 1, in which the motor, the fan and the support are positioned on the convex face side of the radiator so that the forced air flow flows over the said convex face and so that the radial gasket bearing against the bearing surface isolates the concave face and the electronic circuit board from the said flow.

3. Fan-motor unit according to claim 1, in which the radiator has at least one boss determining a cavity between the concave face of the said radiator and the electronic circuit board.

4. Fan-motor unit according to claim 1, in which the interior face of the radial gasket comprises at least one perimetral boss which fits into a groove of the bearing surface.

5. Fan-motor unit according to claim 1, in which: the radiator has one or more openings through each of which at least one connector via which the electronic circuit board supplies the motor passes, each opening is covered by an axial gasket, the said axial gasket having a passage for each connector, the said axial gasket exerting on the said passage a radial pressure of sealing against lateral surfaces of the said connector.

6. Fan-motor unit according to claim 1, in which a cap covers the electronic circuit board and the radial gasket, the said cap determining, with the radiator, a circuit board region and the cap having a closed end on which a peripheral rim and an internal web form a peripheral channel: into which the radial gasket and the peripheral edge of the radiator partially fit, comprising holes creating communications between the said peripheral channel and the inside of the circuit board region in which the electronic circuit board is located.

* * * * *